March 18, 1924.
H. D. PALMER ET AL
1,487,468
APPARATUS FOR MEASURING MATERIALS IN CONCRETE CONSTRUCTION
Original Filed Dec. 5, 1921    3 Sheets-Sheet 1
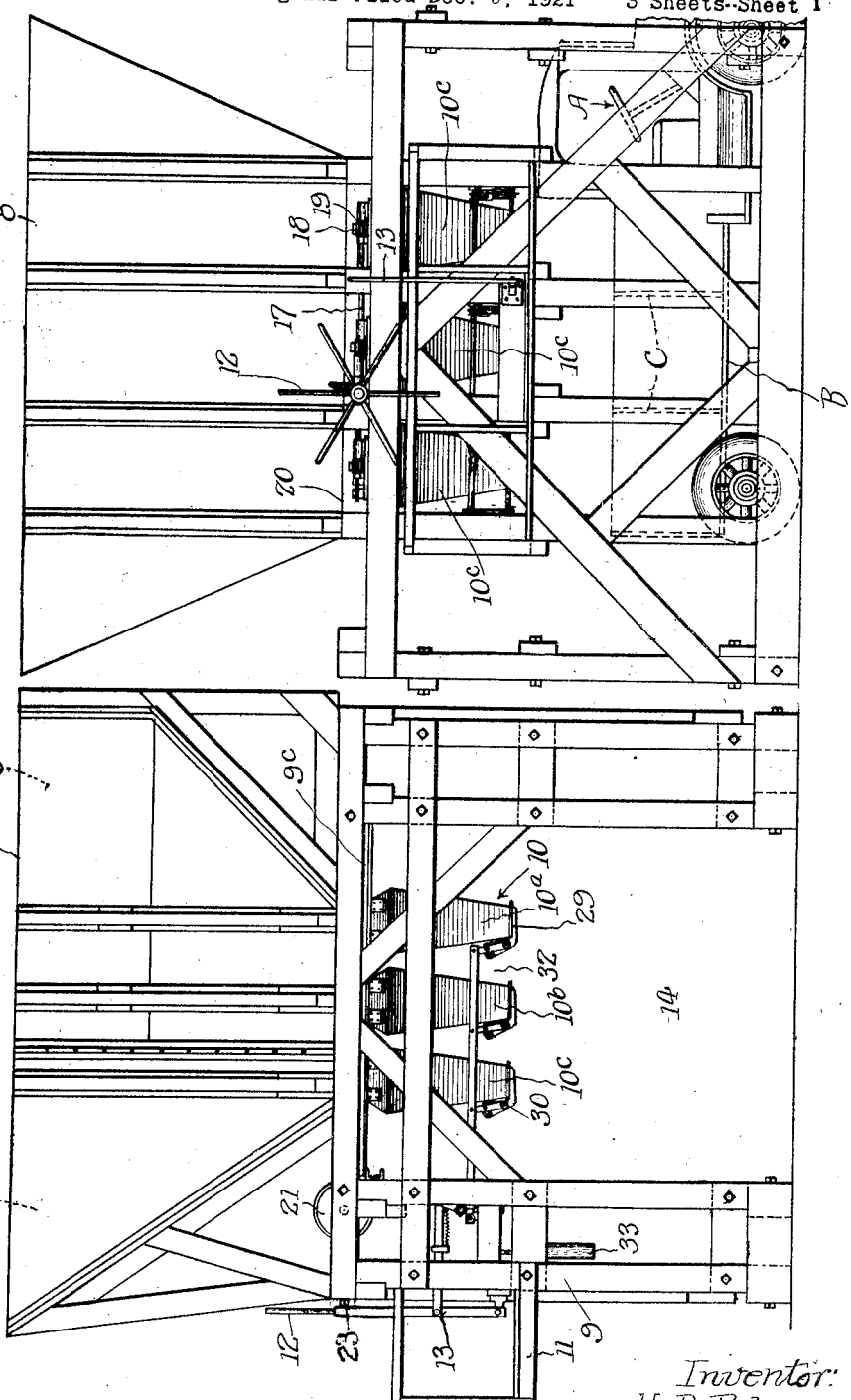
Inventor:
H. D. Palmer,
John W. Brhel,
By Chindahl, Parker & Carlson, Attys.

March 18, 1924.                                                1,487,468
                        H. D. PALMER ET AL
       APPARATUS FOR MEASURING MATERIALS IN CONCRETE CONSTRUCTION
              Original Filed Dec. 5, 1921      3 Sheets-Sheet 2

Inventors:
H. D. Palmer,
John W. Brhel,

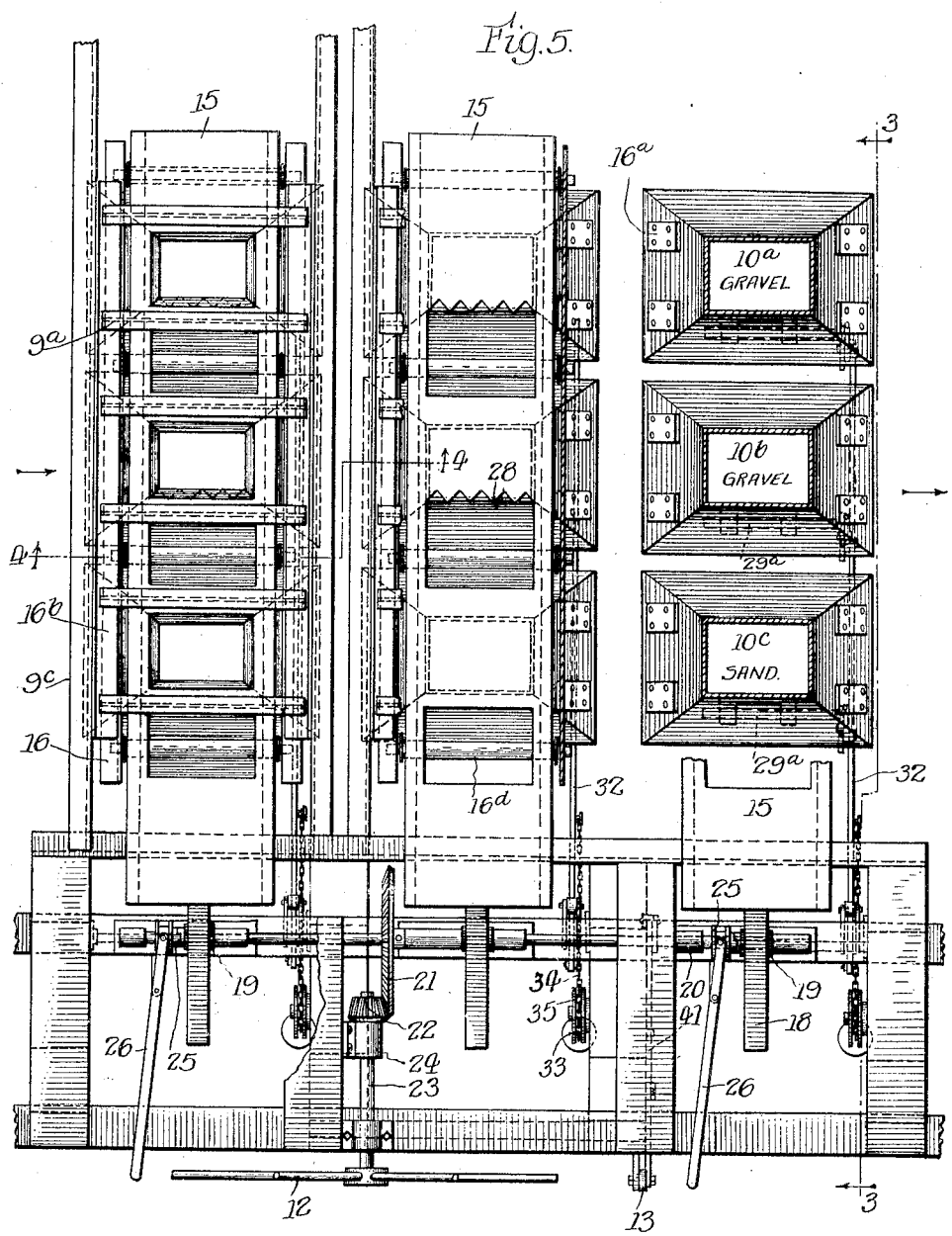

Patented Mar. 18, 1924.

1,487,468

UNITED STATES PATENT OFFICE.

HERMAN D. PALMER AND JOHN W. BRHEL, OF HARTFORD, WISCONSIN, ASSIGNORS TO THE KISSEL MOTOR CAR COMPANY, OF HARTFORD, WISCONSIN, A CORPORATION OF WISCONSIN.

APPARATUS FOR MEASURING MATERIALS IN CONCRETE CONSTRUCTION.

Original application filed December 5, 1921, Serial No. 519,896. Divided and this application filed November 26, 1923. Serial No. 677,044.

*To all whom it may concern:*

Be it known that we, HERMAN D. PALMER and JOHN W. BRHEL, citizens of the United States, residing at Hartford, in the county of Washington and State of Wisconsin, have invented an Improved Apparatus for Measuring Materials in Concrete Construction, of which the following is a specification.

The invention pertains in general to an apparatus adapted for use in handling large quantities of materials such, for example, as sand, gravel and cement, used in the construction of concrete roads, and the present invention has to do with the measuring and more especially the discharge of the materials, after being measured, into vehicles for transportation to the scene of the building operation.

One object of the invention is to provide a means of advantageous character adapted to control the discharge of materials from a plurality of hoppers simultaneously.

A further object of the invention is to provide means whereby after the discharge into selected measuring hoppers of the materials to be measured, only the hoppers thus selected are caused to discharge into a vehicle body stationed beneath them.

The object of the invention thus generally stated, together with other and ancillary advantages, is attained by the construction and arrangement illustrated in the accompanying drawings forming part hereof wherein is illustrated a preferred form of the invention. It is to be understood, however, that the invention is not limited to the precise construction and arrangement herein disclosed, for it will be obvious to those skilled in the art that various changes may be made in form, construction and arrangement of the parts without departing from the spirit and scope of the invention as expressed in the appended claims.

Figure 3:
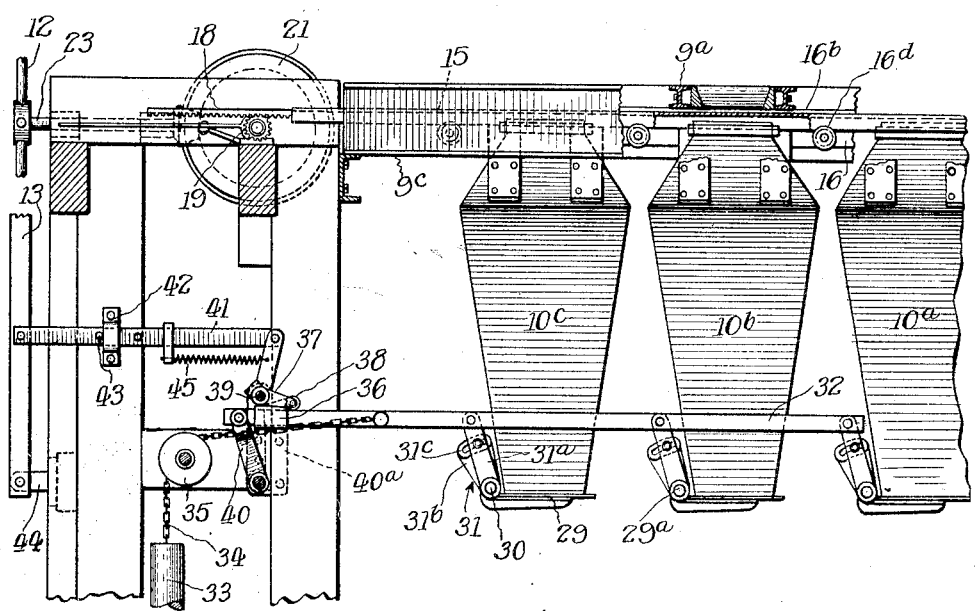
Figure 4:
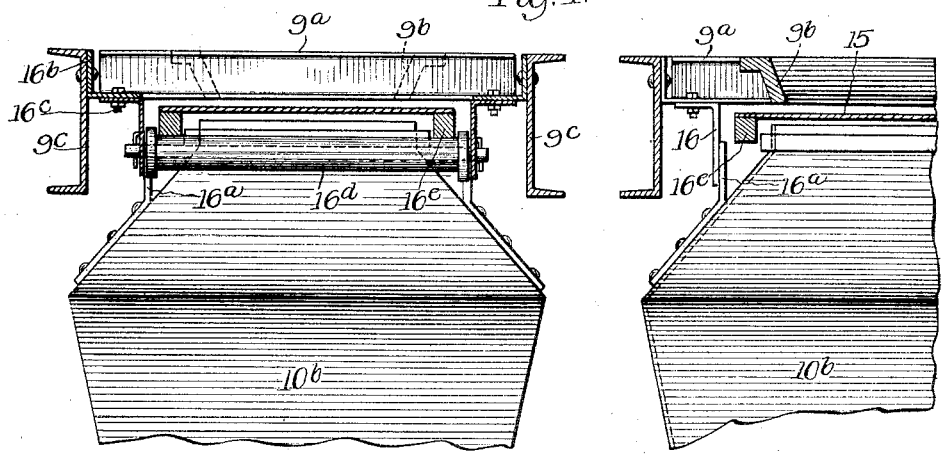

In the drawings, Figure 1 is an end elevation of an apparatus constructed in accordance with our invention. Fig. 2 is a side view of the same showing a truck stationed beneath the measuring hoppers. Fig. 3 is a fragmentary end elevation on an enlarged scale of the lower portions of the hoppers and the means for controlling the flow of material thereinto and the discharge of the material therefrom. Fig. 4 is a fragmentary vertical sectional view taken in the plane of line 4—4 of Fig. 5. Fig. 5 is a fragmentary horizontal plan view taken substantially on the line 4—4 of Fig. 1.

The apparatus comprises a bin 8 mounted upon a supporting structure or framework 9 and having a plurality of compartments therein arranged to discharge into hoppers 10. 11 designates a station or platform provided at one side of the supporting structure for the attendant, and within convenient reach of the attendant on said platform is a spider 12 by the operation of which the attendant controls, through suitable valve means, the flow of the material from the various compartments of the bin 8 into the hoppers 10. Also located adjacent said platform is a controlling lever 13 by the operation of which the attendant controls, through the medium of other valve means, the discharge of material from the hoppers into a vehicle A stationed therebeneath.

The supporting structure or framework 9 may be of any suitable construction designed to support a heavy load. As shown in Fig. 1, this supporting structure is provided with a central areaway 14 through which a motor truck may pass beneath the hoppers. Preferably the parts of the framework are secured together as by means of bolts. It thus is rendered of a knockdown character so that it may be disassembled and moved from place to place as desired.

The bin 8 is mounted upon the framework 9 in any suitable way, but preferably forming an integral part thereof. Herein the floor of the bin rests upon I-beams $9^a$ carried by the framework and has discharge openings above the hoppers provided with cast liners $9^b$ forming discharge nozzles. This bin is divided to form two compartments $8^a$ and $8^b$ containing gravel and sand, respectively. These compartments are arranged so that they extend throughout the length of the bin and are preferably specially constructed in accordance with the peculiar characteristics of sand and gravel to facilitate the flow thereof.

In the present instance nine hoppers are employed. Six of these hoppers communicate with the gravel compartment of the bin 8 and three with the sand compartment, this proportion being determined by the relative quantities of sand and gravel employed in the mix. As shown in Fig. 5, 10$^a$ and 10$^b$ designate gravel hoppers and 10$^c$ designates sand hoppers. These hoppers are transversely alined and each set or row constitutes a unit which is controlled by a single valve device as hereinafter set forth. The vehicle body into which the materials are to be discharged is provided with three compartments arranged from front to rear of the body, and the hoppers of the several units are arranged to discharge respectively into each of such compartments in the truck body. It will thus be seen that one unit of hoppers is provided for each compartment of the truck body, so that with the vehicle travelling in the direction of the arrows indicated in Fig. 5, a batch of sand and gravel of the proper proportions may be discharged into each compartment of the body.

The discharge opening in the lower ends of the compartments 8$^a$ and 8$^b$ are normally closed by means of sliding gate valves 15, the upper ends of the hoppers being spaced from the lower end of the bin for the reception of these valves. Referring to Figs. 3 and 4, the means for thus supporting the hoppers in operative relation to the discharge openings of the bin, comprises a frame for each unit which is removably secured to the supporting structure so as to be readily detachable therefrom. This frame comprises a pair of spaced members 16 arranged on opposite sides of the hoppers and secured thereto by means of hangers or brackets 16$^a$. These members 16 in turn are secured to rigid angle iron supports 16$^b$ by means of bolts 16$^c$, which supports are fixed to transversely extending channel beams 9$^c$ of the framework. Upon opposite sides of each hopper there are mounted in the angle irons of the frame, rollers 16$^d$ upon which the sliding gate valves are mounted. These valves are in the form of elongated plates having a plurality of apertures therein, one for each hopper of the unit, and at their opposite longitudinal edges said plates are provided with longitudinal bearing members 16$^e$ (Fig. 4). It will be seen that by the construction set forth, the hoppers, the sliding gates and the supporting rollers for the gates are all carried by the frame members 16, and are therefore capable of being readily detached from the framework by simply removing the bolts 16$^c$. This construction is advantageous in view of the fact that it frequently becomes necessary to disassemble the apparatus to facilitate its removal from place to place as occasion requires.

The means for actuating the gate valves 15 comprises a longitudinal shaft 17 operatively connected with the plates on the one hand and with the operating spider 12 on the other hand. Each of the plates has rigid with one end a rack bar 18 with which a spur pinion 19 on the shaft 17 is adapted to mesh. Preferably the teeth on the rack bar are formed on the underside thereof so that the bar rolls over the pinion on the shaft. The latter is provided at spaced intervals throughout its lengths with bearings 20 secured on the top of the framework. Fast upon the shaft 17 substantially centrally thereof is a beveled gear 21 with which a bevel pinion 22 on the inner end of a shaft 23 is arranged to mesh. 24 designates a bearing for the shaft 23. Upon the outer end of this shaft is secured the spider 12 (Fig. 1).

The pinions for the valves of two of the units, herein the two ends units, are loose upon the shaft 17 while the intermediate pinion is fast on said shaft. The loose pinions are adapted to be connected with the shaft by means of splined clutch collars 25 controlled by means of levers 26 pivoted upon brackets 27 and operatively engaging with the collars. It will be seen that by means of these levers, either or both of the end units may be rendered inoperative in the operation of the spider 12 to actuate the intermediate unit. Thus the clutch devices constitute means for selectively actuating the gate valve as may be desired. The reason for this construction is that it frequently becomes necessary to vary the number of batches of material to be conveyed by a single truck. Such variation may be necessitated by reason of the variation in the capabilities or capacities of the trucks employed or because of road conditions over which the material must be hauled.

To facilitate movement of the valves past the gravel hoppers, the openings provided therefor are preferably formed with cutting teeth 28 upon the edge opposed to the movement of the valves in the direction to close the openings at the lower ends of the hoppers. The opening for the finer material, such as sand, requires no such special formation.

The lower ends of the hoppers 10 are normally closed by means of a plurality of hinged gates or trap doors 29 which are fast upon shafts 29$^a$ carried by the individual hoppers adjacent their lower ends and at one side edge thereof. Rigid with each of these shafts is an upstanding arm 31 pivoted at its upper end to a trip bar 32 with one end of which is connected a counterweight 33 through the medium of a chain 34 operating over a pulley 35. The arrangement is such that one trip bar is provided for each unit, so that the arms 31 of the doors for the several hoppers of each unit are connected to a common trip bar. The outer end of each trip bar is preferably pivotally supported by an arm 40 pivoted in a bracket 40ª carried by the framework. The counterweight serves to maintain the trap doors of each unit of hoppers closed in the absence of material in the hoppers.

For the purpose of maintaining the doors in normal or closed position when material is discharged into the hoppers through the operation of the sliding gate valves 15, we provide releasable stop devices for the several trip bars 32, operable by means of the single controlling lever 13. This means consists of a stop member 36 carried by each of the bars 32. A bell crank lever 37, carrying a roller 38, is fast upon a shaft 39 which is mounted in the upper ends of the brackets 40ª carried by the framework. Said shaft 39 extends approximately throughout the length of the framework. The bell crank levers 37 are connected with the operating lever 13 by means of a link 41 slidable through a guide plate 42 carried by the framework, and having a limited range of movement as permitted by means of a pair of pins 43 carried by the link and adapted to engage with opposite sides of the plate. At its lower end the lever 13 is pivotally supported by a bracket 44 carried by the framework. A coiled contractile spring 45 serves to move normally the roller stud 38 into the path of movement of the stop members 36 on the trip bars 32.

When the lever 13 is operated to release the trip bars 32 for movement, it will be seen that only the trip bars of the units which have been filled with material are actuated, since the movement of the trip bars depends upon the actuation of the trap doors controlled thereby. Therefore, when through the operation of the controlling levers 26 either of the two end units is rendered inoperative by reason of the sliding gate valves remaining stationary, the corresponding trip bars and trap doors are held stationary by the action of their counterweights when the releasable stop devices are actuated by the lever 13. Accordingly only the trap doors for the loaded hoppers are actuated upon the operation of the controlling lever 13.

Upon the operation of the lever 13, the shaft 39 is rotated and the stop devices for each of the bars 32 actuated to permit the descent of the doors 29 and hence the release of the material from the hoppers. Since all of the doors are operatively associated through the medium of the shafts 30, arms 31 and trip bars 32, it will be seen that the release of the material from all of the loaded hoppers is simultaneously effected through an operation of the single lever 13. When the material from the hoppers has been discharged into a vehicle stationed therebeneath, the counterweights 33, suitably proportioned for this purpose, act through the bars 32 to restore the doors 29 to their closed position. When thus closed, the locking devices for the bars 32 act automatically to reengage the same for the next hopper-filling operation.

In order to permit of the adjustment of the doors 29 with reference to the trip bars 32, we provide a special construction for the arms 31. Thus each of these arms is of a sectional character comprising a section 31ª loose upon the shaft 30 and a section 31ᵇ fast upon the shaft and having at its upper end an arcuate slot 31ᶜ through which and the section 31ª a bolt 31ᵈ is entered.

As previously stated, the vehicle body is divided into three compartments. In this connection reference is made to Fig. 2 in which is shown the motor truck A stationed beneath the hoppers and having a body B provided with two transverse partitions C.

In the use of our improved apparatus, the materials to be measured and discharged are introduced into the proper compartments of the bin by any suitable conveying mechanism (not shown). Assuming that it has been determined that a batch of material is to be delivered to each of the compartments of the truck body, the attendant, stationed upon the platform 11, manipulates the levers 26 so that all of the valve members 15 are connected with the shaft 17. Then during the period preceding the passage of a vehicle beneath the hoppers, and following the preceding vehicle, if such there has been, the attendant, by the manipulation of the operating spider 12, moves all of the gate valves 15 so that the openings therein are caused to register with the lower ends of the compartments and the upper ends of the hoppers. The hoppers are accordingly filled to capacity, the material flowing from the bins until the hoppers are full. Thereupon the operator closes the lower ends of the bins by returning the gate valves to their initial position. The apparatus is now ready for the discharge of the materials into a vehicle body. This is accomplished almost instantaneously through the operation of the controlling lever 13, all of the doors 29 closing the lower ends of the hoppers being simultaneously released. Immediately upon such discharge of the materials from the hoppers, the counterweights 33 act to restore the doors 29 to their closed position whereupon the locking devices for the trip bars automatically reengage therewith to maintain the doors against downward movement. The operator while waiting for the next vehicle or truck to pass beneath the apparatus now has ample time to fill the hoppers from the compartments of the bin, as previously described, for another loading operation.

In the event that it is desired to discharge batches into one or two of the compartments only of the vehicle, the operator effects this result by manipulating the proper levers 26 so as to render the corresponding gate valves 15 inoperative. Then upon the operation of the lever 13 the trap doors of the loaded hoppers open under the weight of the materials and discharge into the vehicle.

It will be observed that the apparatus which we have thus provided simplifies exceedingly the operation of measuring and discharging the materials to constitute the mix, or any portion thereof, it being obvious that the apparatus may be designed so that any or all of the materials may be handled as desired.

This application is a division of our copending application Serial No. 519,896, filed December 5, 1921.

We claim as our invention:

1. In an apparatus of the character described, the combination with a hopper, valve means for closing the lower or discharge end of the hopper comprising a door, a shaft upon which said door is fixed, and means normally holding said door in its closed position comprising a trip bar, an arm fast upon said shaft and connected with said bar, and a releasable device for limiting the movement of said bar in a direction to open said door comprising a rock shaft, a stop member carried by said shaft, a second stop member carried by said bar, spring means normally moving the first stop member into the path of movement of the second stop member, means for limiting the rocking movement of said rock shaft by said spring means, and means for moving said rock shaft in the opposite direction to carry the first stop member out of the path of movement of the second stop member.

2. In an apparatus of the character described, the combination of a plurality of alined measuring hoppers, a door for closing the lower end of each of said hoppers, a shaft for each of said doors, an upstanding arm on each of said shafts at one side of said hoppers, a bar pivoted to the upper ends of each of said arms, and a counterweight connected with said bar normally tending to move said doors into their closed position.

3. In an apparatus of the character described, the combination of a plurality of alined measuring hoppers, a door for closing the lower end of each of said hoppers, a shaft for each of said doors, an upstanding arm on each of said shafts at one side of said hoppers, a bar pivoted to the upper ends of each of said arms, a counterweight connected with said bar normally tending to move said doors into their closed position, and a stop device adapted to engage with said bar normally to hold said doors in closed position.

4. In an apparatus of the character described, the combination of a plurality of alined measuring hoppers, a door for closing the lower end of each of said hoppers, a shaft for each of said doors, an arm on each of said shafts at one side of said hoppers, a bar pivoted to the free ends of each of said arms, a counterweight connected with said bar normally tending to move said doors into their closed position, and a stop device comprising a shaft adjacent said bar, an arm fixed upon said shaft, a stop member secured to said bar and adapted for engagement by said arm, spring means for moving said arm in one direction, and means manually operable to move said arm in the opposite direction.

5. In an apparatus of the character described, the combination of a plurality of hoppers, a door for closing the lower end of each of said hoppers, a plurality of parallel shafts carrying said doors, an arm rigid with each of said shafts, a bar connecting said arms together, and means for limiting movement of said bar in one direction whereby to hold said doors in closed position.

6. In an apparatus of the character described, the combination of a plurality of hoppers, a door for closing the lower end of each of said hoppers, a plurality of parallel shafts carrying said doors, an arm rigid with each of said shafts, a bar connecting said arms together, and means for limiting movement of said bar in one direction whereby to hold said doors in closed position, said arms being of sectional construction to permit of the adjustment of the doors with respect to each other.

7. In an apparatus of the character described, the combination of a plurality of hoppers, a plurality of doors closing the lower ends of said hoppers, a plurality of parallel shafts carrying said doors, an arm rigid with each of said shafts, a bar to which said arms are connected, means for limiting the movement of said bar in one direction whereby to support the doors in their closed position, and means for automatically moving said bar in the opposite direction.

8. In an apparatus of the character described, the combination of a plurality of hoppers, a plurality of doors closing the lower ends of said hoppers, a plurality of parallel shafts carrying said doors, an arm rigid with each of said shafts, a bar to which said arms are connected, releasable means for limiting the movement of said bar in one direction comprising a rock shaft; spring means for moving said rock shaft in one direction, and manually operable means for releasing said shaft for movement in the opposite direction.

9. In an apparatus of the character described, the combination of a plurality of hoppers arranged in a plurality of rows, a door closing the lower end of each hopper, a plurality of parallel shafts each carrying the doors of the plurality of hoppers, an arm rigid with each of said shafts, a bar to which the upper ends of said arms are connected, and a releasable stop device operable to limit the movement of said bar in one direction whereby to support the doors in their closed position.

10. In an apparatus of the character described, the combination of a plurality of hoppers arranged in a plurality of rows, a door closing the lower end of each hopper, a plurality of parallel shafts each carrying the doors of the plurality of hoppers, an arm rigid with each of said shafts, a bar to which the free ends of said arms are connected, a releasable stop device operable to limit the movement of said bar in one direction whereby to support the doors in their closed position, and means acting automatically to restore said doors to their closed or locked position.

11. In an apparatus of the character described, the combination of a plurality of hoppers, a door for closing the lower end of each of said hoppers, separate means connecting the doors of the hoppers in groups or sets, the doors in each set being operable in unison, means normally tending to move the doors of each set into their closed positions, and a releasable device adapted to lock all of the doors in their closed positions, the doors of one set being operable independently of the doors of the other set.

In testimony whereof we have hereunto affixed our signatures.

HERMAN D. PALMER.
JOHN W. BRHEL.